United States Patent [19]

Lieder et al.

[11] 4,332,781

[45] Jun. 1, 1982

[54] REMOVAL OF HYDROGEN SULFIDE AND CARBONYL SULFIDE FROM GAS-STREAMS

[75] Inventors: Charles A. Lieder; Carl H. Deal, both of Houston, Tex.

[73] Assignee: Shell Oil Company, Houston, Tex.

[21] Appl. No.: 220,487

[22] Filed: Dec. 29, 1980

[51] Int. Cl.³ .................... C01B 17/05; B01D 53/34
[52] U.S. Cl. .................................. 423/573 G; 423/224;
423/226; 423/228; 423/229; 423/244; 423/437;
423/564
[58] Field of Search ............... 423/224, 226, 228, 229,
423/243, 244, 437, 563, 564, 571, 573 R, 573 G,
244 R

[56] References Cited

U.S. PATENT DOCUMENTS

| | | | |
|---|---|---|---|
| 3,068,065 | 12/1962 | Hartley et al. | 423/228 |
| 3,074,783 | 1/1963 | Paull | 423/437 |
| 3,347,621 | 10/1967 | Papadopoulos et al. | 423/226 |
| 3,580,950 | 5/1971 | Bersworth | 560/169 |
| 3,961,015 | 6/1976 | Dailey | 423/229 |
| 4,085,192 | 4/1978 | Van Scoy | 423/226 |

FOREIGN PATENT DOCUMENTS 999799  7/1965  United Kingdom ............ 423/573 L

Primary Examiner—Earl C. Thomas

[57] ABSTRACT

Hydrogen sulfide and carbonyl sulfide are removed from a gas stream in a staged procedure characterized by conversion of the hydrogen sulfide to produce sulfur in aqueous solution, hydrolysis of the carbonyl sulfide remaining in the gas stream to produce hydrogen sulfide and carbon dioxide, and removal of the hydrogen sulfide from the gas stream.

34 Claims, 3 Drawing Figures

REMOVAL OF HYDROGEN SULFIDE AND CARBONYL SULFIDE FROM GAS-STREAMS

BACKGROUND OF THE INVENTION

The presence of significant quantities of $H_2S$ in various "sour" industrial gaseous streams poses a persistent problem. To remove this contaminant, various procedures have been developed. An additional contaminant in many such gases is carbonyl sulfide. In many cases, those processes which remove $H_2S$ are unsuitable for or deficient in the removal of COS. For example, in conventional solvent absorption-desorption processes, the COS is only partly absorbed, so that recovery is not efficient.

In another cyclic process that is currently attracting attention, sour gas is contacted with aqueous oxidizing reactant solution to convert the $H_2S$ to free sulfur. In most instances, COS is unaffected by the reactants employed. For example, where such reactant materials as polyvalent metal ions or polyvalent metal chelates in aqueous solution are reacted with the $H_2S$, the COS does not react and remains in the gaseous stream. Thus, a need has existed for an efficient process that treats gas streams which contain $H_2S$ and COS. The invention is such a process.

SUMMARY OF THE INVENTION

Accordingly, the invention relates to a process for the removal of $H_2S$ and COS from sour gaseous streams containing $H_2S$ and COS comprising:

(a) contacting the sour gaseous stream in a contacting zone with an aqueous reactant solution, the solution comprising an effective amount of an oxidizing reactant under conditions to produce a gas stream containing COS and an aqueous admixture containing sulfur and a reduced reactant;

(b) contacting the gas stream containing COS with a catalyst for the hydrolysis of COS, in the presence of water, and under conditions to react COS and water and produce a gas stream containing $CO_2$ and $H_2S$;

(c) and removing the $H_2S$ from the gas stream.

Two modes of removal of the $H_2S$ produced from the hydrolysis of COS are suitably employed. In one embodiment, the $H_2S$ in the gas stream is contacted in a "secondary" contact zone, with reactant solution, in a manner similar to that in which the main quantity of $H_2S$ has been removed previously in the "primary" zone. In another embodiment, an absorption-desorption system may be used, the recovered $H_2S$ being treated as desired. In this embodiment, $CO_2$ produced by the hydrolysis may be left in the product gas, or absorbed, as desired, by techniques known in the art. For example, an $H_2S$-selective absorbent that is also $CO_2$-selective may be used to remove the $CO_2$ from the product stream.

Whichever method of removal of the $H_2S$ produced from the hydrolysis reaction is employed, the process of the invention is preferably operated as a cyclic procedure with provision for removal of sulfur produced and regeneration of the aqueous reactant solution. In particular, the process of the invention provides for sulfur removal before or after regeneration of the aqueous reactant solution. If a reactant solution is utilized to remove the $H_2S$ produced from hydrolysis of COS, by producing sulfur, and the resulting reactant solution is combined with the "primary" aqueous reactant solution, all of the sulfur may be removed after the combination. Alternatively, the sulfur from the hydrolysis may be removed separately, or passed on to the "primary" contact zone for "subsequent" removal. Where $H_2S$ from the hydrolysis reaction is removed by absorption, the $H_2S$, on desorption, is preferably passed to the "primary" removal stage for conversion to sulfur, which is removed, as desired. Sulfur removal from solution is preferably accomplished by physical means, such as filtration or use of a hydrocyclone, etc.

DETAILED DESCRIPTION OF THE INVENTION

In the first step of the process, the gas stream to be treated is contacted with an aqueous oxidizing reactant solution. Any suitable aqueous oxidizing reactant material may be utilized. Particularly suitable reactant materials include polyvalent metallic ions, (and mixtures thereof), such as iron, vanadium copper, manganese, and nickel, and include polyvalent metal chelates, (and mixtures thereof), and mixtures of the ions and chelates. As used herein, unless otherwise inconsistent with the intent expressed, the term "mixtures thereof", in referring to the reactant materials indicated, includes mixtures of the polyvalent metal ions, mixtures of the polyvalent metal chelates, and mixtures of polyvalent metal ions and polyvalent metal chelates. Preferred reactants are coordination complexes in which polyvalent metals form chelates with an acid having the formula:

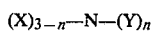

wherein n is a whole number from 1 to 3; Y is an acetic acid or propionic acid group; X is 2-hydroxyethyl, 2-hydroxy propyl, or an alkyl group having from one to four carbon atoms; or

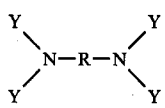

wherein:

from two to four of the groups Y are selected from acetic and propionic acid groups;

from zero to two of the groups Y are selected from 2-hydroxy ethyl, 2-hydroxy propyl, and

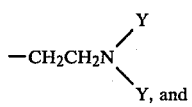

R is ethylene, propylene or isopropylene or alternatively cyclohexane or benzene where the two hydrogen atoms replaced by nitrogen are in the 1,2 position, and mixtures of such complexes.

Any polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. The amount of reactant compound, chelate, or mixture thereof, supplied is an effective amount, i.e., that amount sufficient to convert all or substantially all of the $H_2S$ in the gas stream, and will generally be on the order of at least about two mols (basis polyvalent metal or chemical equivalent) per mol of $H_2S$. Ratios of from about 2 mols to about 15 mols of compound or chelate per mol of $H_2S$ may be used, with ratios of from about 2 mols per mol to about 5 mols of compound or chelate per mol of $H_2S$ being preferred. The manner of preparing the aqueous reactant solution is a matter of choice and within the skill of the art, and a wide variety of aqueous oxidizing reactant solutions may be employed.

The particular type of gaseous stream treated is not critical, regardless of which embodiment of the invention is employed, as will be evident to those skilled in the art. Streams particularly suited to the practice of the invention are naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having low concentrations of $H_2S$ and $CO_2$. The term "hydrocarbon streams", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 5 percent by volume. COS content may also vary, but preferably will range from about 0.01 percent to about 1 percent by volume. Obviously, the amount of $H_2S$ and COS present is not generally a limiting factor in the practice of the invention.

The temperatures employed in the contact or primary contact zone are not generally critical, except that higher temperatures appear to enhance decomposition of complexes employed. A relatively wide range of temperatures, e.g., from 10° C. to 80° C. or even 110° C. may be utilized, although a range of from about 20° C. to about 60° C. is preferred. In many commercial applications, such as the removal of $H_2S$ from natural gas to meet pipeline specifications, contact at ambient temperatures is preferred. Contact times will range from about 1 second to about 120 seconds, with contact times of 2 seconds to 60 seconds being preferred.

Similarly, in the regeneration zone or zones, temperatures may be varied widely. Preferably, the regeneration zone should be maintained as close as possible to the same temperature as the contact or primary contact zone. If heat is added to strip or assist regeneration, cooling of the admixture is required before return of the admixture to the contact or primary zone. In general, temperatures of from about 10° C. to 80° C., preferably 20° C. to 60° C. may be employed.

Pressure conditions in the contact or primary zone may vary widely, depending on the pressure of the gas to be treated. For example, pressures in the contact zone may vary from one atmosphere up to one hundred fifty or even two hundred atmospheres. Pressures of from one atmosphere to about one hundred atmospheres are preferred. In the regeneration zone or zones, pressures will range from about one atmosphere to about three or four atmospheres. The pressure-temperature relationships involved are well understood by those skilled in the art, and need not be detailed herein. Conditions of operation for this type of reaction process are further described in U.S. Pat. No. 3,068,065 to Hartley, et al., dated Dec. 11, 1962, and Great Britain patent specification no. 999,799 to Nichol et al., published July 28, 1965, which disclosures are incorporated herein by reference. The procedure is preferably conducted continuously.

As noted, the oxidizing reactant, especially the polyvalent metal compounds and polyvalent metal chelates, are supplied as an aqueous solution. Other solvents or absorbents (or mixtures of absorbents) may be present to enhance $H_2S$ conversion, or absorb $CO_2$, the limiting factors being the degree to which other components of the gas stream (such as the COS) are absorbed in the solvent or absorbent and the degree to which the reactant compounds or chelates may be "salted" out or poisoned. Since the COS is to be removed, as described herein, it is not desired that any absorbent present in the principal contact zone exhibit a significant solvency for COS. If an absorbent is employed, the absorbents employed are those absorbents which have a high degree of selectivity in absorbing $CO_2$ (and preferably $H_2S$ as well) from the gaseous streams. Any of the known absorbents conventionally used (or mixtures thereof) which do not affect the activity of the reactant, whch exhibit sufficient miscibility or solvency for the reactant or reactant solution, and which do not substantially absorb COS may be employed. The particular absorbent chosen is a matter of choice, given these qualifications, and selection can be made by routine experimentation.

The reactant solution is regenerated by stripping with oxygen. As used herein, the term oxygen includes oxygen-containing gases, such as air. The oxygen stripping accomplishes two functions, the stripping of any residual $CO_2$ (if originally present) and the oxidation of the reduced reactant to its higher oxidation state. The oxygen (in whatever form supplied) is supplied in a stoichiometric excess with respect to the amount of reduced reactant present in the mixture. Preferably, the oxygen is supplied in an amount of from about 1.2 to 3 times excess.

As indicated, the gas stream, after removal of H₂S, is treated to remove COS. The hydrolysis of COS is shown by the following formula:

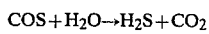

$$COS + H_2O \rightarrow H_2S + CO_2$$

In general, the contacting of the gas stream with the aqueous reactant solution often provides sufficient water, as vapor, for the hydrolysis of the COS, although additional water may be added if the COS concentration is high.

Any catalyst demonstrating activity for this reaction may be employed. Preferred catalysts are Ni, Pd, Pt, Co, Rh or In. In general, most of these materials will be provided as solids deposited on a suitable support material, preferred support materials being the aluminas, silica aluminas, and silica. The selection of the particular catalyst (and support, if employed) are within the skill of those working in the field. Platinum on alumina is preferred.

The temperatures employed in the hydrolysis zone are not critical, except in the sense that the temperatures employed will allow substantially complete conversion of the COS. Temperatures will range from about 50° C. to 150° C. or even 200° C., although a range of from about 50° C. to about 150° C. is preferred. As noted previously, in many commercial applications, such as the removal of H₂S and COS from natural gas to meet pipeline specifications, contact at ambient temperatures or as close to ambient temperatures as possible are preferred. Those skilled in the art may adjust the temperatures, as needed, to provide efficient reaction temperatures. Contact times will range from about 0.5 second to about 10 seconds, with contact times of 1 second to 3 seconds being preferred. It will be noted that if CS₂ is present in the gas stream, the CS₂ will be converted by the reaction

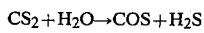

$$CS_2 + H_2O \rightarrow COS + H_2S$$

The CS₂ may then be removed by the expedient of utilization of longer contact times. Pressures employed in the hydrolysis zone will approximate those in the contact or primary contact zone.

In accordance with the invention, the H₂S produced from the COS hydrolysis is removed from the gas stream. If a "secondary" contact zone is employed, temperatures, pressures, etc. will be similar to those in the "primary" contact zone, the principal difference between the two zones being the normally relatively smaller concentration of H₂S being removed. Preferably, the reactant solution employed is all or part of the regenerated solution from the regeneration zone. As described, supra, the sulfur produced may be removed, as desired.

Alternately, the H₂S from the hydrolysis of the COS may be removed from the gas stream in an absorption zone by absorption in a suitable absorbent or solvent. After absorption of the H₂S, the "loaded" absorbent is removed from the absorption zone, the H₂S is stripped from the loaded absorbent in a stripping or regeneration zone, the "lean" absorbent is returned for re-use, and the H₂S is disposed of. Preferably, the H₂S is returned to the contact zone for reaction to sulfur. Solvents, pressures, temperatures, etc. for this type of procedure are known and well understood by those skilled in the art, and may readily adjusted to provide optimum results. For example, those solvents and conditions, etc. described in U.S. Pat. No. 3,347,621 to Papadopoulos, et al., and U.S. Pat. No. 4,085,192 to Van Scoy, both incorporated herein by reference, may be utilized. Mixtures of such solvents or absorbents also may be used.

In order to describe the invention with greater particularity, reference is made to the accompanying schematic drawing.

Figure 1:
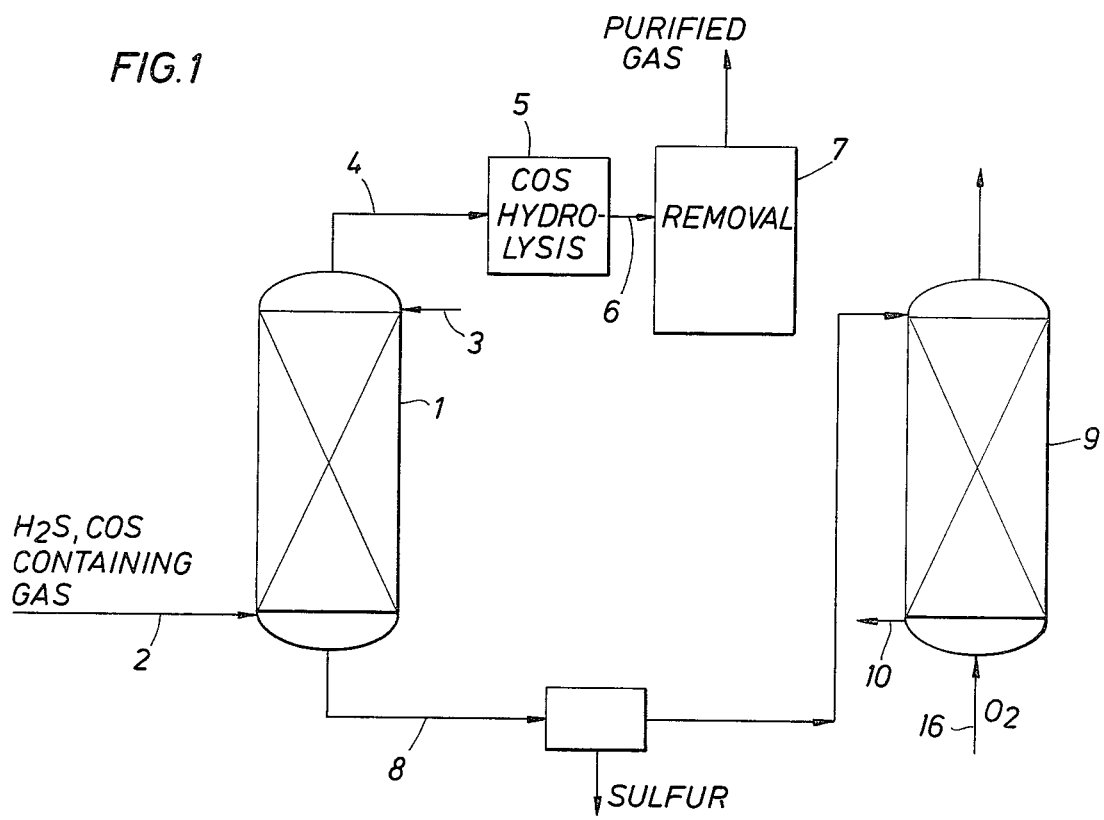
FIG. 1 illustrates the broad removal approach of the invention.

In FIG. 1, a gas stream, such as a natural gas stream containing 1 percent H₂S and 0.1 percent COS, enters contactor 1 via line 2. Contactor 1 is a tray contactor, although any suitable contacting device (such as a venturi) may be employed. An aqueous oxidizing reactant solution, e.g., a solution containing 0.4 molar of the Fe(III) complex of (n-hydroxyethyl)ethylene diamine triacetic acid, enters contactor 1 via line 3. For illustrative purposes, it will be assumed that the gaseous stream enters at 200 MSCF per hour, while the reactant solution enters at 20 M gallons per hour. Pressure of the gas in line 1 is 1000 PSIG, and the temperature of the gas is 30° C. Reactant solution is supplied at a temperature of 30° C. The countercurrent flow of liquid and gas, as illustrated, provides for good contact and reaction of the H₂S in the stream to sulfur. As will be understood by those skilled in the art, water and the Fe(II) complex or chelate of (n-hydroxyethyl)ethylene diamine triacetic acid are also produced by the reaction.

Upon exit from contactor 1, the gas stream, which is now substantially free of H₂S, passes via line 4 to reaction or contact zone 5 wherein it is contacted with a catalyst containing about one percent Pt on activated alumina. The temperature of the exit of reactor 5 is about 100° C., pressure about 1000 psig, and total contact time in zone 5 is 2 seconds. In this illustration, sufficient water vapor is present from the transit of the gaseous stream through contactor 1 so that water need not be added. Obviously, water may be added, if necessary. Substantially complete conversion of the COS may be achieved in this contact zone.

From contact zone 5, the gas stream, now containing H₂S and CO₂ from the hydrolysis of COS, passes via line 6 to H₂S removal zone 7. Removal zone 7 may utilize a reactant solution or absorption-desorption system, as set out more fully hereinafter. Purified gas is removed, as shown.

Concomitantly, the reaction solution in contactor 1, now containing some reduced reactant, sulfur and additional water, is passed via line 8 to regeneration zone 9 where the solution is contacted with air via line 16 to regenerate the reduced complex. The molar ratio of oxygen (in air) to Fe(II) complex is maintained to about 2 to 1, and temperature in the regeneration zone is maintained at about 30° C. Regenerated solution is removed via line 10, and may be returned, at least partly, to contactor 1. Sulfur removal is shown prior to regeneration, by filtration.

Figure 2:
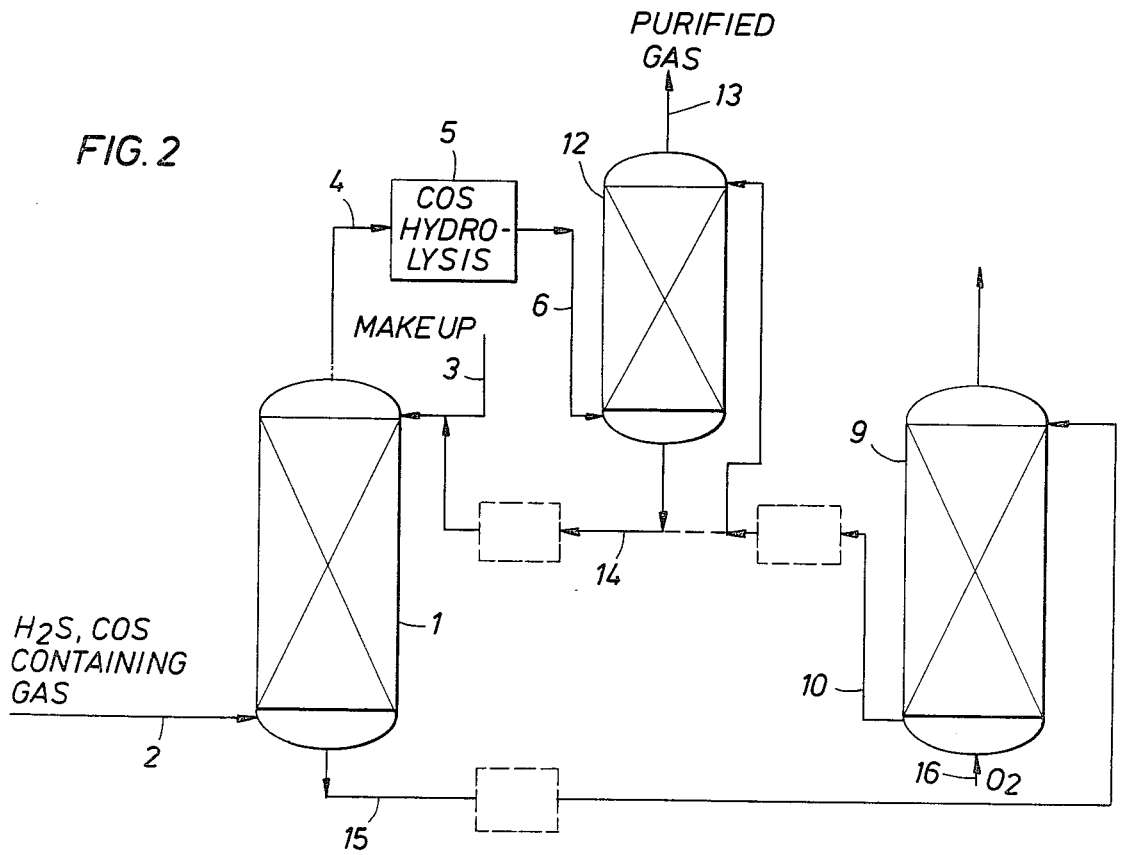
FIG. 2 and FIG. 3 illustrate differing concepts of removal of H₂S produced by hydrolysis of COS. All values are merely exemplary or calculated, and similar number designations represent similar features.

In FIG. 2, a gas stream similar to that described previously enters contactor 1 via line 2 and is contacted with a 0.4 molar aqueous solution of the Fe(III) chelate of nitrilo triacetic acid from line 3. The partially purified gas is contacted in reaction zone 5 in the presence of water vapor with a catalyst comprising about one percent Pt on activated alumina to hydrolize the COS in the stream to $H_2S$ and $CO_2$. Temperatures, pressure, etc., are similar to those described in reference to FIG. 1. In accordance with the invention, the gas stream, containing the hydrolysis products, passes via line 6 to "secondary" contactor 12 where it is contacted with an aqueous reactant solution to produce sulfur. While the reactant solution contact procedure employed in contactor 12, including the solution employed, may be quite independent from the contact procedure employed in "primary" contactor 1, it is much preferred that the reactant solution be the same or similar, and that the solution employed in 12 constitute the solution utilized in contactor 1, or be a portion thereof. Thus, e.g., the solution employed in 12 may be the make-up for contactor 1, may be the regenerated stream from a regeneration zone, may be merely a portion of the regenerated reactant solution from a regeneration zone, or any suitable combination thereof. What is important, simply, is that sufficient reactant (e.g., polyvalent metal ions or chelate) be present in contactor 12 to convert the $H_2S$ in stream 6 to sulfur. For purposes of this illustration, the reactant solution employed is the regenerated solution containing the Fe (III) chelate of nitrilotriacetic acid to be employed in the primary contact zone, as outlined more fully hereinafter. Accordingly, the reaction of the $H_2S$ and the Fe (III) chelate of nitrilotriacetic acid produces sulfur and the reduced chelate, but, because the concentration of $H_2S$ in stream 6 is low, the reaction solution is quite suitable for use in contactor 1. Purified gas is removed via line 13, and $CO_2$ may be removed, if desired, by known techniques. After contact in contactor 12 reactant solution is forwarded, via line 14, to line 3 and thence to contactor 1. Sulfur may or may not be removed prior to entry of the reactant solution into contactor 1.

Concomitantly, reactant solution, containing some Fe(II) chelate of nitrilotriacetic acid and sulfur, are forwarded via line 15 to regeneration zone 9. As shown in dotted line boxes, the sulfur may be removed prior to regeneration, after regeneration, or after exit from unit 12. Preferably, sulfur is removed prior to regeneration.

In regeneration 9, oxygen is supplied, via line 16, in molar excess. Preferably, the oxygen is supplied as air, in a ratio of about 2.0 or greater per mole of Fe(II) chelate in the solution. Temperature of the solution is preferably around 30° C., and pressure is suitably 25 psig. Regeneration in this manner has the added advantage of removing some water vapor, thus aiding in prevention of water build-up in the system and reducing bleed and make-up problems. It is not necessary that all of the FE(II) chelate be converted.

Regeneration solution, i.e., a solution in which at least the bulk of the Fe(II) chelate has been converted to the Fe(III) chelate, is removed via line 10. As indicated, the solution may be passed, (all, or part) to contactor 12, or into line 14 and through line 13 to contactor 1.

Figure 3:
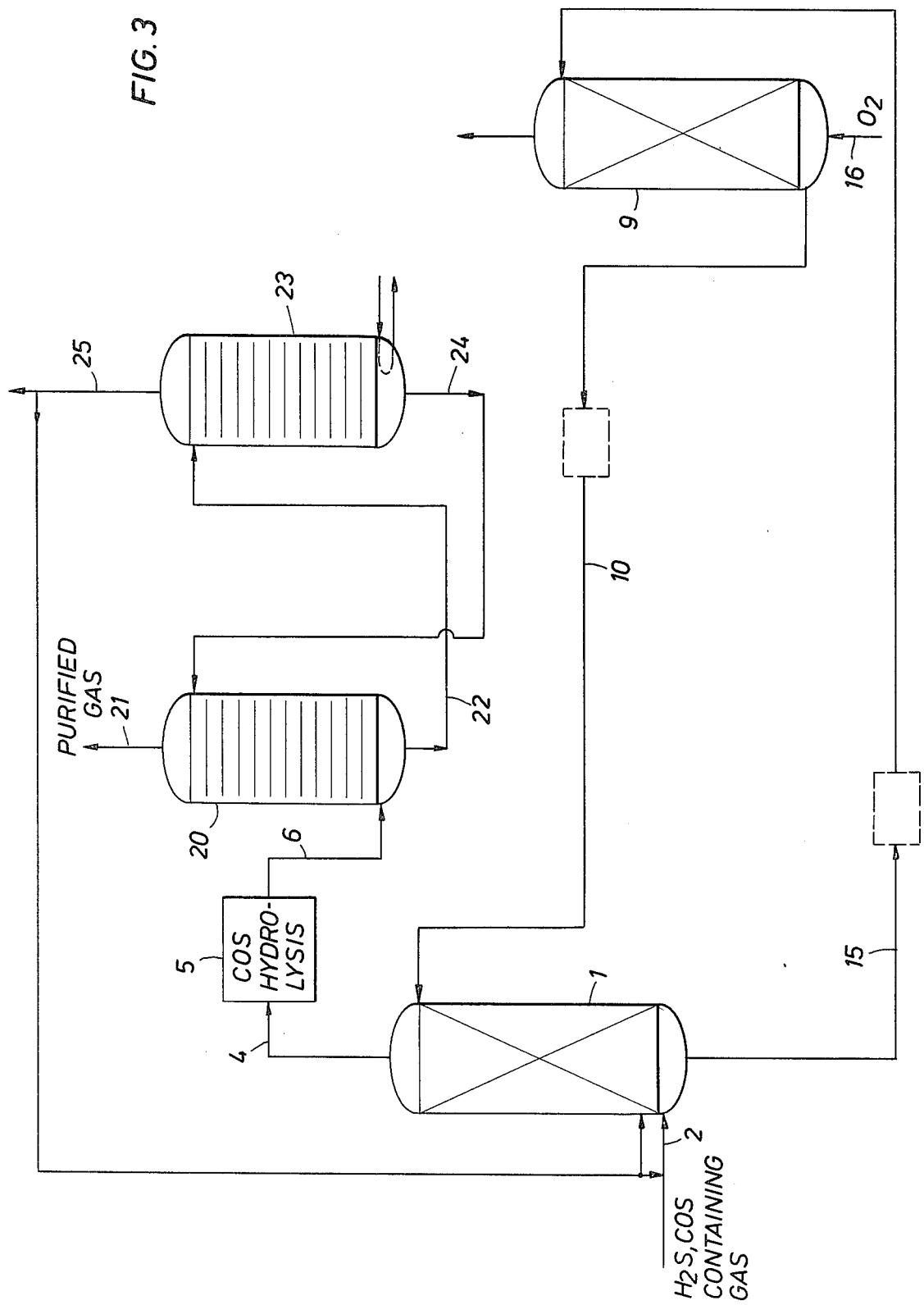

In the embodiment of FIG. 3, the operation of units 1, 2, 4, 5, 6, 9, 10, 15 and 16 is similar to that of corresponding units of the embodiment of FIGS. 1 and 2. However, the treatment of the $H_2S$ (and $CO_2$, if desired) from the hydrolysis is different, and the return of the regenerated reactant solution is direct. Specifically, the gas stream in line 6 enters absorber 20 wherein it is contacted with an absorbent solution, e.g., an aqueous solution containing 2 molar diisopropanolamine. Absorber 20 is preferably a tray absorption column, although other types may be used. $H_2S$ is absorbed from the gas stream, the purified gas exiting absorber 20 via line 21. Conditions for absorbing the $H_2S$ from the gas stream are well known, and form no part of the invention. The $H_2S$-containing ("loaded") absorbent exits absorber 20 via line 22, and passes to stripping or regeneration column 23 wherein the $H_2S$ is stripped from the absorbent, preferably by heat supplied as steam. "Lean" absorbent is returned via line 24 for re-utilization in absorber 20, while $H_2S$ is removed via line 25. The $H_2S$ in line 25 may be treated in any suitable fashion, but is preferably returned to contactor 1, either directly, or via line 2. If $CO_2$ has been absorbed to any extent, provision may also be made for its removal or recovery. Concomitantly, the regenerated reactant solution from regeneration column 9 is passed, via line 10 to contactor 1. Sulfur recovery may be made prior or subsequent to regeneration (shown as dotted line boxes).

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, an absorption column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

What is claimed is:

1. A process for removal of $H_2S$ and COS from a sour gaseous stream containing $H_2S$ and COS comprising:
   (a) contacting said sour gaseous stream in a contacting zone with an aqueous reactant solution, the solution comprising an effective amount of an oxidizing reactant, to produce a gas stream containing COS and an aqueous admixture containing sulfur and a reduced reactant;
   (b) contacting the gas stream containing COS with a catalyst for the hydrolysis of COS, in the presence of water, and under conditions to react COS and water, and producing a gas stream containing $CO_2$ and $H_2S$;
   (c) and removing the $H_2S$ from the gas stream.

2. A process for the removal of $H_2S$ and COS from a sour gaseous stream containing $H_2S$ and COS comprising:
   (a) contacting said sour gaseous stream in a contacting zone with an aqueous reactant solution, the solution comprising an effective amount of an oxidizing reactant, under conditions to produce a gas stream containing COS and an aqueous admixture containing sulfur and a reduced reactant;
   (b) contacting the gas stream containing COS with a catalyst for the hydrolysis of COS, in the presence of water, and under conditions to convert COS and water, and producing a gas stream containing $CO_2$ and $H_2S$;
   (c) removing the $H_2S$ from the gas stream by contacting the gas stream with an aqueous reactant solution which comprises an effective amount of an oxidizing reactant, and producing a purified gas stream and reactant solution containing sulfur.

3. The process of claim 1 wherein the sulfur is removed from the aqueous admixture produced in step (a), the admixture is stripped in a stripping zone with oxygen to produce a regenerated aqueous reactant solution, at least a portion of the regenerated reactant solution is employed in step (c) to remove the H₂S from the gas stream by contacting the gas stream with the regenerated reactant solution, and producing regenerated reactant solution containing sulfur, and employing the regenerated reactant solution containing sulfur as aqueous reactant solution of step (a).

4. The process of claim 2 wherein the aqueous admixture is stripped in a stripping zone with oxygen to produce a regenerated aqueous reactant solution, sulfur is removed, at least a portion of the regenerated reactant solution is employed in step (c) to remove the H₂S from the gas stream by contacting the gas stream with the regenerated reactant solution, and producing a regenerated reactant solution containing sulfur, and employing the regenerated reactant solution containing sulfur as aqueous reactant solution of step (a).

5. A process for the removal of H₂S and COS from a sour gaseous stream containing H₂S and COS comprising:
   (a) contacting said sour gaseous stream in a contacting zone with an aqueous reactant solution, the solution comprising an effective amount of an oxidizing reactant selected from polyvalent metal ions, polyvalent metal chelate compounds, and mixtures thereof, to produce a gas stream containing COS and an aqueous admixture containing sulfur and a reduced reactant;
   (b) contacting the gas stream containing COS with a catalyst for the hydrolysis of COS, in the presence of water, and under conditions to react COS and water, and producing a gas stream containing CO₂ and H₂S;
   (c) and removing the H₂S from the gas stream.

6. A process for the removal of H₂S and COS from a sour gaseous stream containing H₂S and COS comprising:
   (a) contacting said sour gaseous stream in a contacting zone with an aqueous reactant solution, the solution comprising an effective amount of an oxidizing reactant solution from polyvalent metal ions, polyvalent metal chelate compounds, and mixtures thereof, to produce a gas stream containing COS and an aqueous admixture containing sulfur and a reduced reactant;
   (b) contacting the gas stream containing COS with a catalyst for the hydrolysis of COS, in the presence of water, and under conditions to convert COS and water, and producing a gas stream containing CO₂ and H₂S;
   (c) removing the H₂S from the gas stream by contacting the gas stream with an aqueous oxidizing reactant solution which comprises an effective amount of a reactant selected from polyvalent metal ions, polyvalent metal chelate compounds, and mixtures thereof, and producing a purified gas stream and reactant solution containing sulfur.

7. The process of claim 5 wherein the sulfur is removed from the aqueous admixture produced in step (a), the admixture is stripped in a stripping zone with oxygen to produce a regenerated aqueous reactant solution, at least a portion of the regenerated reactant solution is employed in step (c) to remove the H₂S from the gas stream by contacting the gas stream with the regenerated reactant solution, and producing regenerated reactant solution containing sulfur, and employing the regenerated reactant solution containing sulfur as aqueous reactant solution of step (a).

8. The process of claim 6 wherein the aqueous admixture is stripped in a stripping zone with oxygen to produce a regenerated aqueous reactant solution, sulfur is removed, at least a portion of the regenerated reactant solution is employed in step (c) to remove the H₂S from the gas stream by contacting the gas stream with the regenerated reactant solution, and producing a regenerated reactant solution containing sulfur, and employing the regenerated reactant solution containing sulfur as aqueous reactant solution of step (a).

9. The process of claim 6 wherein the admixture containing sulfur is stripped in a stripping zone with oxygen to produce a regenerated aqueous reactant solution containing sulfur, at least a portion of the regenerated reactant solution containing sulfur is employed in step (c) to remove the H₂S from the gas stream by contacting the gas stream with the regenerated reactant solution, sulfur is removed from the aqueous regenerated reactant solution to produce a regenerated reactant solution, and regenerated reactant solution is employed as aqueous reactant solution of step (a).

10. The process of claim 7 wherein the portion of regenerated reactant solution employed in step (c) is a minor portion.

11. The process of claim 8 wherein the portion of regenerated reactant solution employed in step (c) is a minor portion.

12. The process of claim 9 wherein the portion of regenerated reactant solution employed in step (c) is a minor portion.

13. The process of claim 12 wherein the minor portion of regenerated reactant solution containing sulfur is combined with the regenerated reactant solution prior to removing sulfur from the regenerated reactant solution.

14. The process of claim 7 wherein the reactant comprises a polyvalent metal chelate compound or a mixture of polyvalent metal chelate compounds.

15. The process of claim 8 wherein the reactant comprises a polyvalent metal chelate compound or a mixture of polyvalent metal chelate compounds.

16. The process of claim 9 wherein the reactant comprises a polyvalent metal chelate compound or a mixture of polyvalent metal chelate compounds.

17. The process of claim 7 wherein the reactant comprises an iron chelate of an acid having the formula

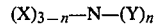

wherein n is a whole number from 1 to 3; Y is an acetic acid or propionic acid group; X is 2-hydroxyethyl, 2-hydroxy propyl, or an alkyl group having from one to four carbon atoms; or

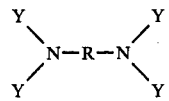

wherein:
   from two to four of the groups Y are selected from acetic and propionic acid groups;
   from zero to two of the groups Y are selected from 2-hydroxy ethyl, 2-hydroxy propyl, and

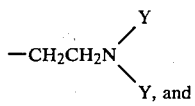

R is ethylene, propylene or isopropylene or alternatively cyclohexane or benzene where the two hydrogen atoms replaced by nitrogen are in the 1,2 position, and mixtures thereof.

18. The process of claim 8 wherein the reactant comprises an iron chelate of an acid having the formula

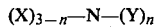

wherein n is a whole number from 1 to 3; Y is an acetic acid or propionic acid group; X is 2-hydroxyethyl, 2-hydroxy propyl, or an alkyl group having from one to four carbon atoms; or

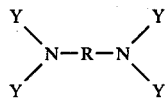

wherein:
from two to four of the groups Y are selected from acetic and propionic acid groups;
from zero to two of the groups Y are selected from 2-hydroxy ethyl, 2-hydroxy propyl, and

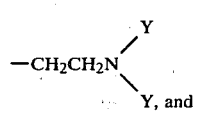

R is ethylene, propylene or isopropylene or alternatively cyclohexane or benzene where the two hydrogen atoms replaced by nitrogen are in the 1,2 position, and mixtures thereof.

19. The process of claim 9 wherein the reactant comprises an iron chelate of an acid having the formula

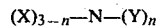

wherein n is a whole number from 1 to 3; Y is an acetic acid or propionic acid group; X is 2-hydroxyethyl, 2-hydroxy propyl, or an alkyl group having from one to four carbon atoms; or

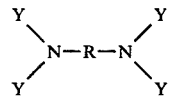

wherein:
from two to four of the groups Y are selected from acetic and propionic acid groups;
from zero to two of the groups Y are selected from 2-hydroxy ethyl, 2-hydroxy propyl, and

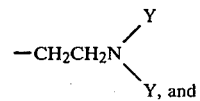

R is ethylene, propylene or isopropylene or alternatively cyclohexane or benzene where the two hydrogen atoms replaced by nitrogen are in the 1,2 position, and mixtures thereof.

20. The process of claim 7 wherein the reactant is selected from iron chelates of (n-hydroxyethyl) ethylene diamine triacetic acid, nitrilotriacetic acid, and mixtures of such iron chelates.

21. The process of claim 8 wherein the reactant is selected from iron chelates of (n-hydroxyethyl) ethylene diamine triacetic acid, nitrilotriacetic acid, and mixtures of such iron chelates.

22. The process of claim 9 wherein the reactant is selected from iron chelates of (n-hydroxyethyl) ethylene diamine triacetic acid, nitrilotriacetic acid, and mixtures of such iron chelates.

23. The process of claim 10 wherein the reactant is selected from iron chelates of (n-hydroxyethyl) ethylene diamine triacetic acid, nitrilotriacetic acid, and mixtures of such iron chelates.

24. The process of claim 11 wherein the reactant is selected from iron chelates of (n-hydroxyethyl) ethylene diamine triacetic acid, nitrilotriacetic acid, and mixtures of such iron chelates.

25. The process of claim 12 wherein the reactant is selected from iron chelates of (n-hydroxyethyl) ethylene diamine triacetic acid, nitrilotriacetic acid, and mixtures of such iron chelates.

26. A process for the removal of $H_2S$ and COS from a sour gaseous stream containing $H_2S$ and COS comprising:
(a) contacting said sour gaseous stream in a contacting zone with an aqueous reactant solution, the solution comprising an effective amount of an oxidizing reactant comprising polyvalent metal ions, polyvalent metal chelate compounds, and mixtures thereof, to produce a gas stream containing COS and an aqueous admixture containing sulfur and a reduced reactant;
(b) contacting the gas stream containing COS with a catalyst for the hydrolysis of COS, in the presence of water, and under conditions to react COS and water, and producing a gas stream containing $CO_2$ and $H_2S$;
(c) removing the $H_2S$ from the gas stream;
(d) stripping the aqueous admixture in a stripping zone with oxygen to produce a regenerated aqueous reactant solution;
(e) employing regenerated aqueous reactant solution as aqueous reactant solution in step (a).

27. The process of claim 1 wherein the $H_2S$ is removed in step (c) by contacting the gas stream with an $H_2S$-selective absorbent in an absorption zone to produce a purified gas stream and $H_2S$-containing absorbent, $H_2S$-containing absorbent is passed from the absorption zone to a regeneration zone, the bulk of the $H_2S$ is removed from the absorbent in the regeneration zone, and lean absorbent is returned to the absorption zone.

28. The process of claim 27 wherein $H_2S$ desorbed in the regeneration zone is passed to the contacting zone of step (a) and converted to sulfur.

29. The process of claim 28 wherein sulfur is removed prior to stripping the aqueous admixture in step (d).

30. The process of claim 28 wherein sulfur is removed after stripping the aqueous admixture in step (d).

31. The process of claim 6 wherein the $H_2S$ is removed in step (c) by contacting the gas stream with an $H_2S$-selective absorbent in an absorption zone to produce a purified gas stream and $H_2S$-containing absorbent, H₂S-containing absorbent is passed from the absorption zone to a regeneration zone, the bulk of the H₂S is removed from the absorbent in the regeneration zone, and lean absorbent is returned to the absorption zone.

32. The process of claim 31 wherein H₂S desorbed in the regeneration zone is passed to the contacting zone of step (a) and converted to sulfur.

33. The process of claim 32 wherein sulfur is removed prior to stripping the aqueous admixture in step (d).

34. The process of claim 32 wherein sulfur is removed after stripping the aqueous admixture in step (d).

* * * * *